United States Patent [19]

Chen

[11] Patent Number: 5,828,548
[45] Date of Patent: Oct. 27, 1998

[54] REMOVABLE HARD DISK DRIVE MOUNTING/DISMOUNTING ARRANGEMENT

[76] Inventor: Chih-Kung Chen, 2FL., No. 1-16, Tung Shih Street, Nuan Nuan Dist. Chi Lung City, Taiwan

[21] Appl. No.: 846,489

[22] Filed: Apr. 28, 1997

[51] Int. Cl.⁶ .................................. G06F 1/16; H05K 5/02
[52] U.S. Cl. ........................ 361/685; 361/726; 312/332.1
[58] Field of Search ...................... 364/708.1; 312/330.1, 312/223.2, 332.1, 333; 361/683–685, 725–727, 732, 740, 798, 801

[56] References Cited

U.S. PATENT DOCUMENTS 5,563,767  10/1996  Chen ........................................ 361/685
5,694,290  12/1997  Chang ...................................... 361/685

*Primary Examiner*—Lynn D. Feild
*Attorney, Agent, or Firm*—Bacon & Thomas, PLLC

[57] ABSTRACT

A removable hard disk drive mounting arrangement includes structures at the end of a rack that cooperate with structures on the shaft of a pivotal handle to ensure that final insertion of the hard disk drive casing into the rack is carried out in an even manner without excessive force. The mounting arrangement includes two notches at the end of a pivotal shaft of a handle for the casing, and corresponding angles and bent portions of the rack which permit final insertion of the hard disk driving casing into the rack only when the handle is turned from a horizontal to a vertical position.

2 Claims, 5 Drawing Sheets

5,828,548

REMOVABLE HARD DISK DRIVE MOUNTING/DISMOUNTING ARRANGEMENT

BACKGROUND OF THE INVENTION

The present invention relates to an improved hard disk mounting/dismounting structure in which the handle shaft end of a hard disk drive casing has two setting notches, and the end of the hard disk drive receiving rack has relative check angles and bent portions which orient the hard disk drive to provide a correct mounting angle and avoid unusual wear between the hard disk drive and a connector on the rack.

The birth of the computer may be said to be the greatest work in this century and the widespread circulation of the PC (personal computer) has fully realized the function of computer. Today in industrial, commercial and service sectors, the use of computers for handling various kinds of tasks has become a commonplace, and even home computer users in general have been engaged in communication or shopping through computer networks. This has been a global trend.

In a computer, both hard disk and floppy disk drives have provided necessary data for computer operation, and especially the hard disk has the storage capacity and computation ability that a floppy disk can not compete with, and therefore it is just like a heart for a computer. At present, PC hard disk drives in a computer may include a fixed hard disk drive mounted in the host unit, and a removable hard disk drive that can be extracted from the host unit at random. The latter drive offers the convenience of portability and security for confidential data or huge databases stored on the hard disk and which may be needed at anytime.

An extractable hard disk drive mounting arrangement in general includes two devices: the hard disk drive casing 10 and a rack 11. The rack 11 is fixed on the structure of the host unit 12 and both are joined together by means of a connector 13 at the end of the hard disk casing and the rack connector 14 (FIG. 1). Because the removable hard disk must be available for random extraction and mounting, the number of times the hard disk casing accesses the rack is greatly increased, and such actions may cause wearing to the connectors on the hard disk casing and the rack. In fact, however, the rate of natural wearing for the connectors due to proper extraction or mounting is very low. Instead, uneven wearing or an accelerated wearing rate are often caused by man-made improper operation, which moreover might cause deformation to the terminal of connector.

Unusual wearing of a connector caused by man-made error is mostly attributed to improper force applied during extraction and mounting. Generally speaking, the amount of force applied and degree of extraction angle for extracting or mounting a hard disk drive from or to a rack varies subject to the different users, and the connector can not be adjusted with the degree of connection angle or the amount of connection force to fit the different users. This is the main reason unusual wearing of the connector appears. The unusual wearing may become more serious when a computer is jointly used by different users. A connector with excessive or unusual wearing will cause operation of the hard disk to be unreliable, and therefore incorrect data transmission and processing by the hard disk may result in a great risk of data loss.

The cause for unusual wearing of the connector of the removable hard disk drive lies in an imbalanced connection or disconnection due to a man-made uneven force applied during extraction and mounting. Therefore, the resolution lies in providing an appropriate extraction device which may exclude the factor of man-made improper operation while establishing a uniform action of extraction/mounting in order to eliminate unusual wearing of the connector and further prolong the life span of the product and maintain a stable effect. To meet the above-said purpose, the mounting arrangement of the invention includes a couple of setting notches at the end of a handle shaft of the hard disk casing, and relative check angles and bends at the end of the entrance to the rack. According to such a structure, when the hard disk drive casing is mounted in the rack, the handle of the hard disk drive casing must be turned to horizontal to allow the hard disk drive casing to be pushed into the rack smoothly, and then the handle is turned downward to vertical so that the hard disk will be automatically loaded in the rack in balance. When the handle is turned to horizontal, the connectors of the hard disk drive casing and the rack can be automatically disconnected in balance and the hard disk drive casing can be extracted in a safe manner. Therefore, the hard disk drive casing may be mounted and extracted smoothly to avoid damage to the hard disk due to improper mounting and extraction of the hard disk drive casing.

These and other objects and advantages of the present invention will become apparent to those skilled in art after considering the following detailed specification together with the accompanying drawings.

DETAILED DESCRIPTION OF PREFERRED EMBODIMENT

Figure 1:
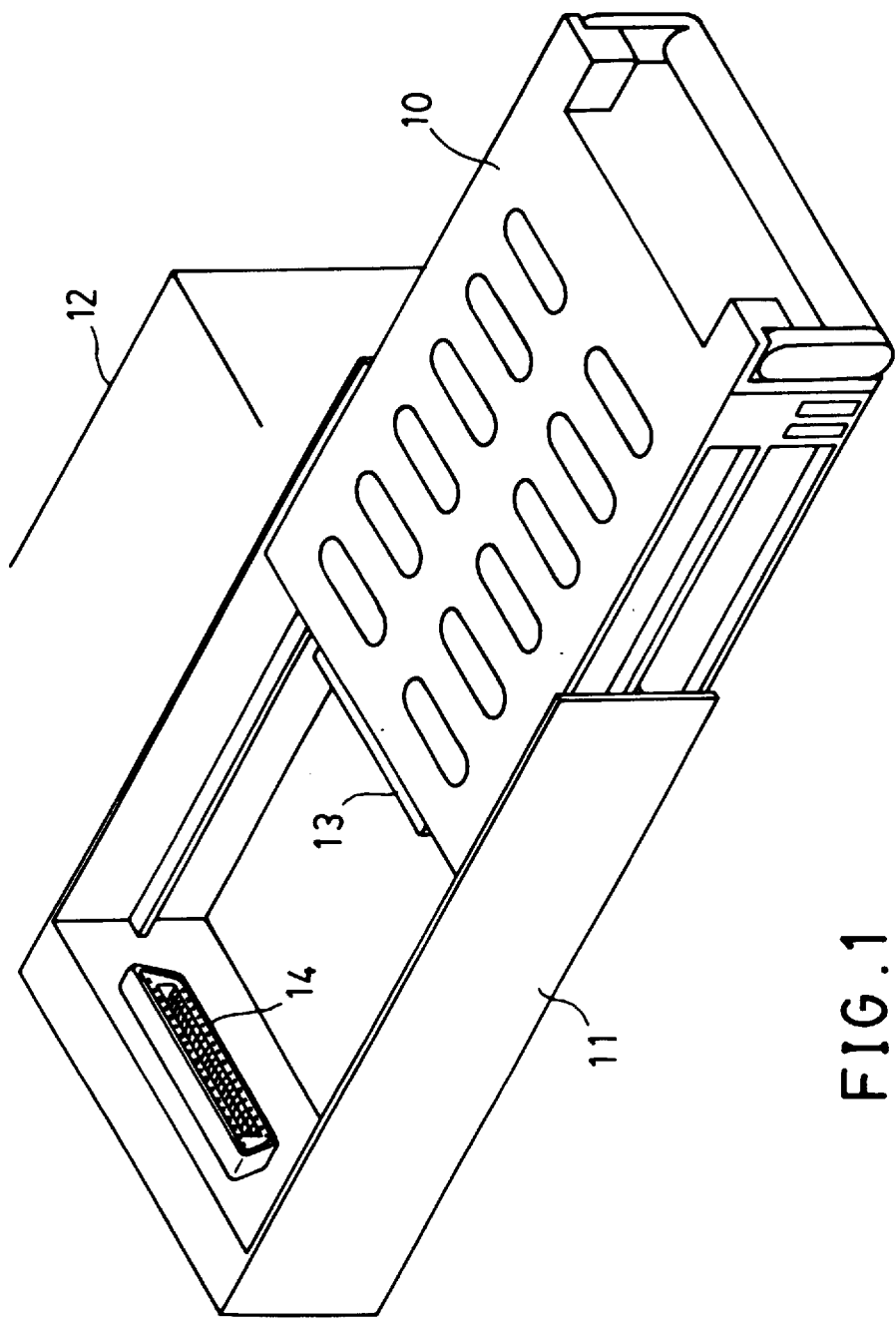
FIG. 1 is an elevational view of the structure of a conventional extractable hard disk drive mounting arrangement.
Figure 2:
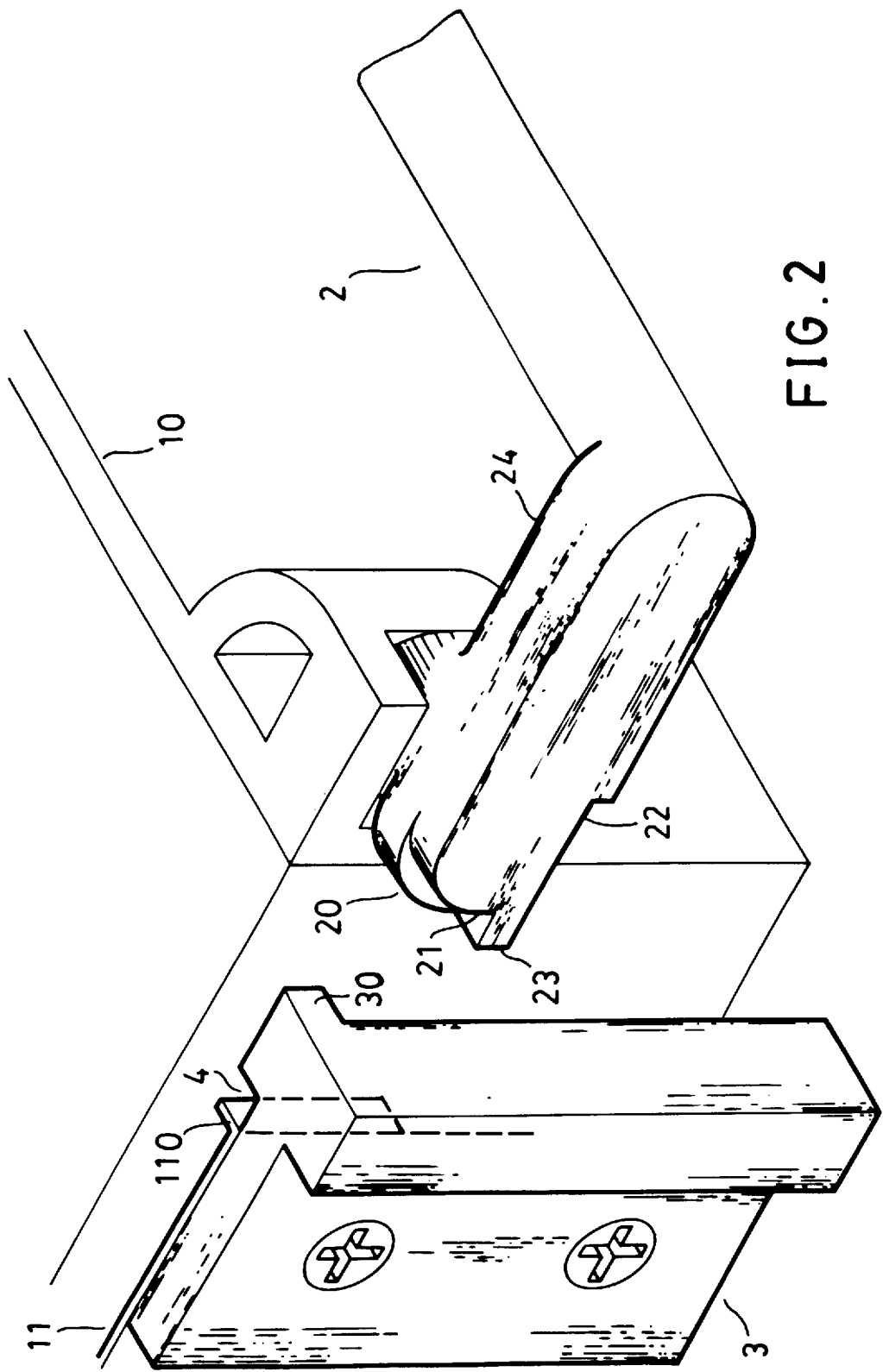
FIG. 2. is an elevational view of the structure of present invention.
Figure 3:
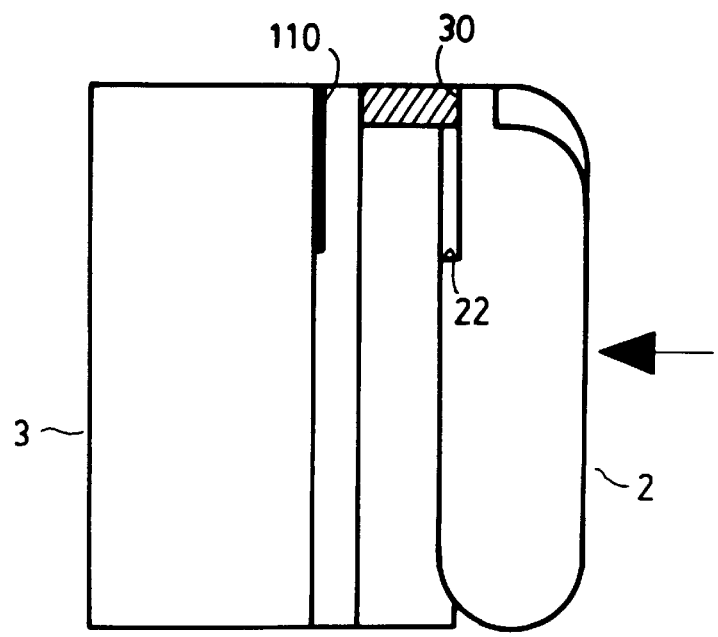
FIGS. 3 thru 6 are match-up action diagrams of the handle end, check angles, and folds included in the hard disk drive mounting arrangement of the present invention.
Figure 4:
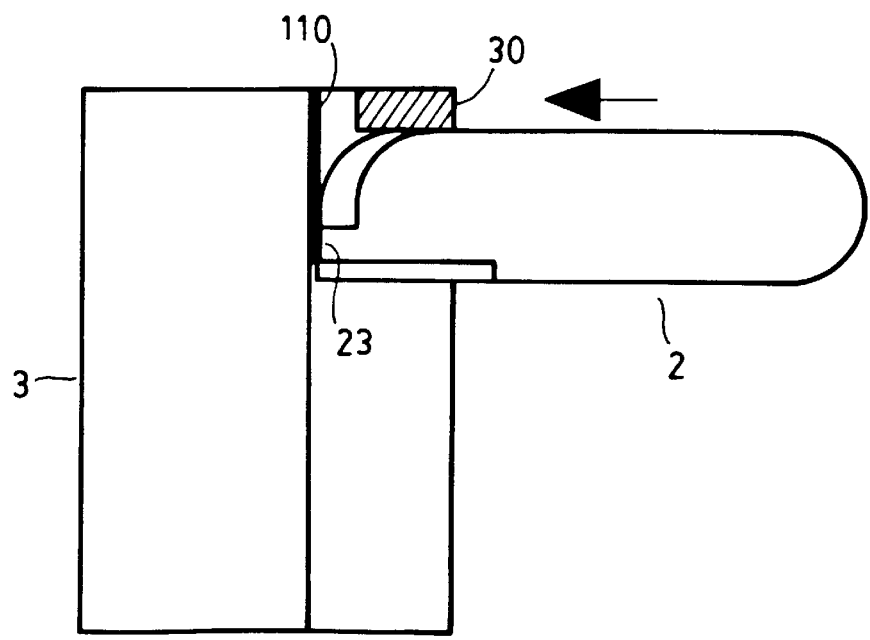
Figure 5:
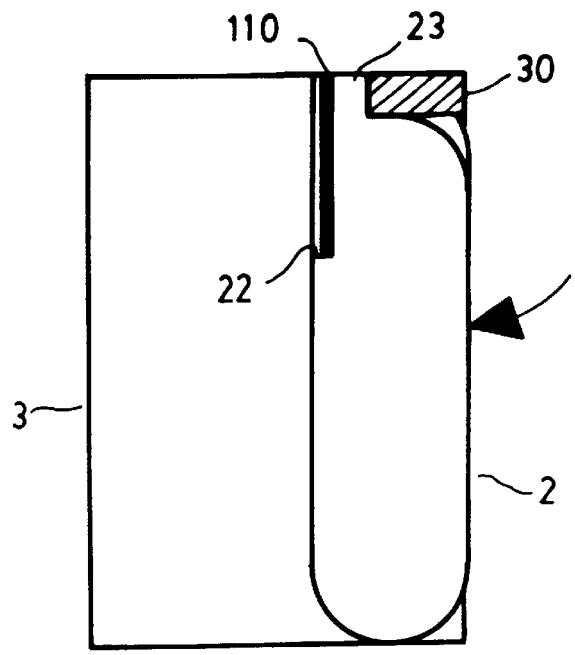
Figure 6:
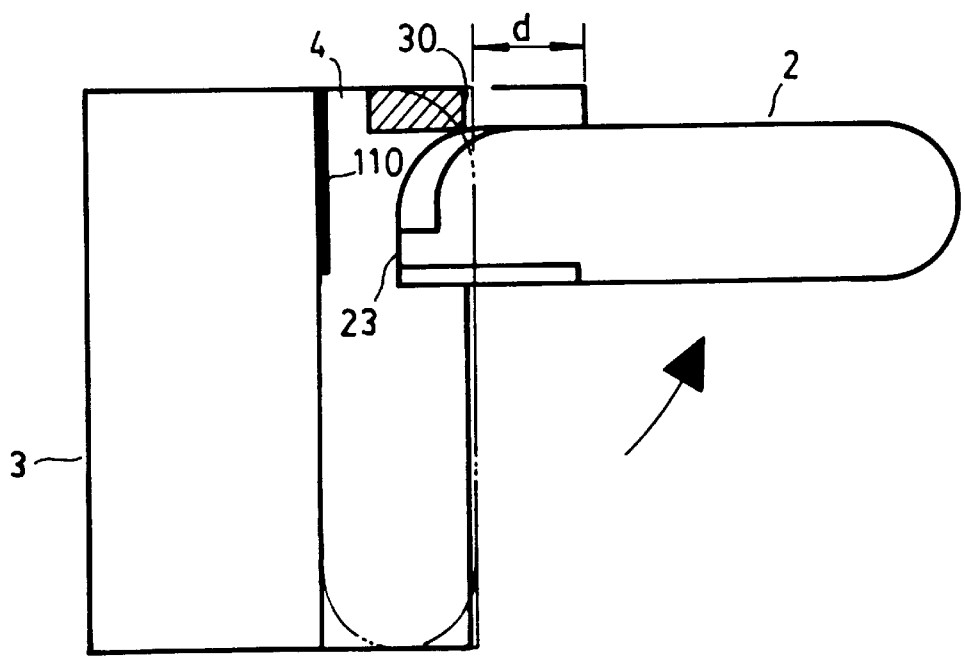
Figure 7:
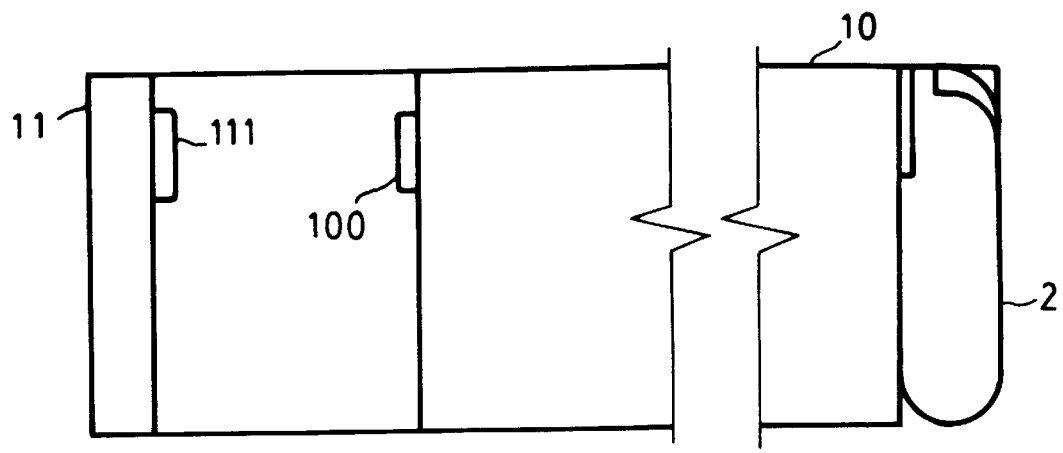
FIGS. 7 thru 9 are action relationship diagrams of the handle and connector according to the present invention.
Figure 8:
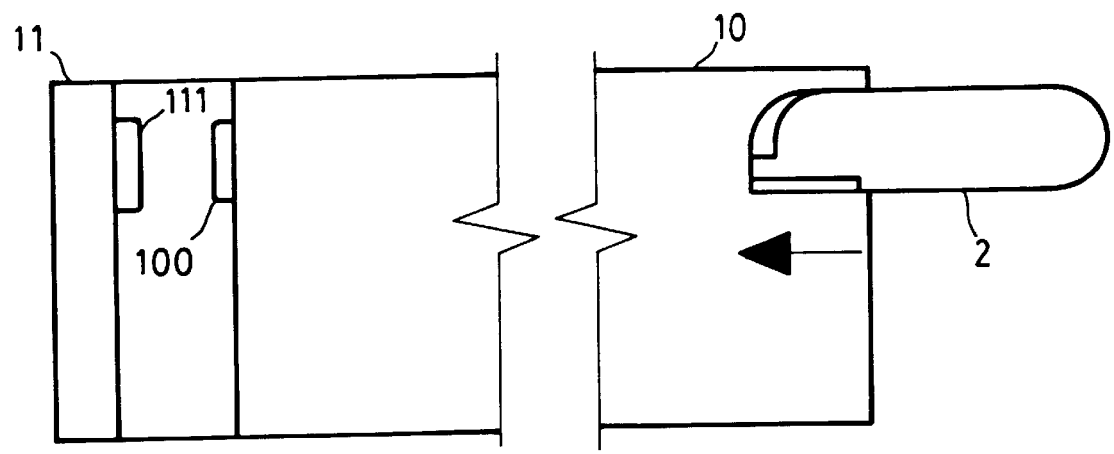
Figure 9:
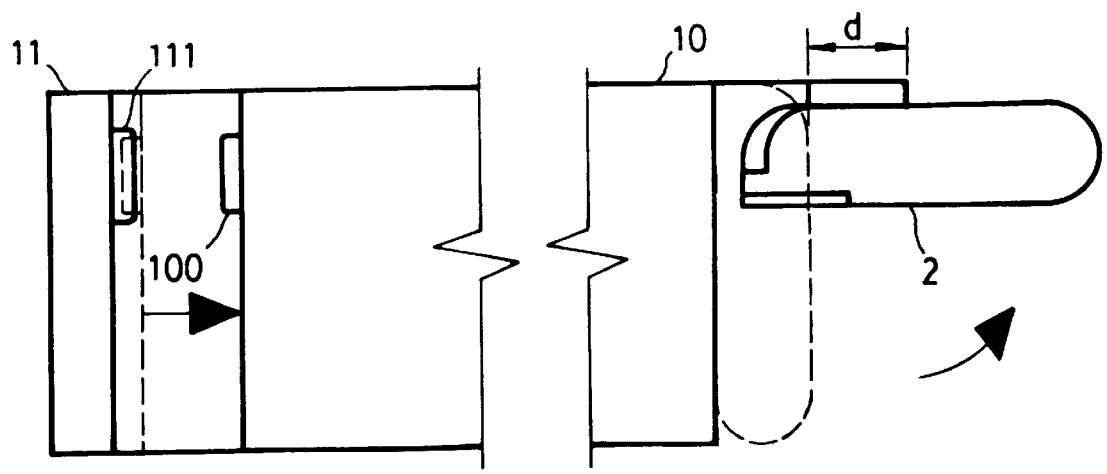

Referring to FIG. 2 the handle 2 in the front end of the hard disk drive casing 10 is wider than the main body of the hard disk drive casing 10, and includes a shaft 24 extending to the hard disk drive casing 10 so as to form an arc end 20. The arc end is cut to form an arc-shaped notch 21 and a linear notch 22 longitudinally along the shaft 24, and the portion between the two notches 21, 22 forms a retaining portion 23. The opening end of hard disk drive rack 11 forms an L-shape bend 110 which is a little shorter than the longitudinal length of linear notch 22. The bend 110 is screwed to a T-shape block 3 to form a retaining port 4 between the T-shape block 3 and the bent portion 110. The outermost top end of T-shape block 3 forms an inverted L-shape portion or check angle 30 toward the internal plate of rack.

Referring to FIGS. 3 thru 9, when the hard disk drive casing 10 with the handle of the present invention is mounted in the rack 11, the handle 2 has to be turned to horizontal manner so as to enter the rack 11 past the a horizontal portion of the L-shaped portion or check angle 30 of T-shape block 3. When the handle 2 is vertical or at elevational angle, the linear notch 22 will be stopped by the check angle 30 of the T-shape block so that the hard disk drive casing can not enter, preventing uneven force from being applied by a user who has not properly treated the handle as the means of mounting the hard disk drive casing. When the hard drive casing 101 has smoothly entered the rack 11, the arc end 20 of the handle will be stopped by the bent portion 110 before the connector 100 of the hard disk drive casing has joined with the connector 111 of the rack. The design of the bent portion 110 stops the arc end 20 of the handle and prevents an excessive pushing force from causing damage or serious wearing to the connectors. When the hard disk drive box is stopped by bent portion 110 from being pushed further in, the handle 2 is turned downward to vertical and the arc end 20 of the handle will gradually break away from the stop of the fold 110 to cause the hard disk drive casing 10 to be pushed forward and the two connectors 100, 111 to gradually contact each other. Finally, the retaining portion 23 of the handle will move upward and enter the retaining opening 4 to let the two connectors 100, 111 automatically join together in balance so that the hard disk drive casing 10 and the rack 11 can fully join together. Automatic connection of the hard disk drive casing and the rack by means of turning the handle downward precludes non-uniform man-made forces during connection of the two connectors to avoid possible damage and improper wearing of the connectors.

Referring to FIGS. 3 thru 9, after turning the handle to horizontal and then vertical to permit mounting of the hard disk device casing into the rack in a safe and smooth manner, the retaining portion 23 of handle is situated in the notch 4, and bent portion 110 is positioned in the linear notch 22, causing the hard disk drive casing 10 to be locked in the rack 11. The correct way of extracting the hard disk drive casing 10 is to turn the handle 2 upward to horizontal so that the arc end 20 will be turned downward to thrust against the bent portion 110. The thrust force against the bent portion produces a counteractive force to push the hard disk drive box 10 out of the rack 11 a small distance d in balance. The distance d allowing the connectors 100, 111 of the hard disk drive casing and the rack to disengage each other while the hard disk drive casing 10 and the rack 11 are not communicated each other so that the hard disk drive casing can be extracted easily. The feature of turning the handle to make the hard disk drive casing retreat a small distance automatically avoids improper wearing of the connectors as a result of uneven forces applied during the extraction of the hard disk drive casing.

To conclude the above description, the present invention makes use of the arc end and linear notch of the handle shaft, and the bent portion and T-shape block on the opening end of the rack, to provide smooth mounting or extraction of the hard disk drive casing in or form the rack by means of turning the handle to horizontal or vertical, and for connection of the connectors of the hard disk drive casing and the rack at a normal angle to avoid uneven wearing of the connectors which would result in intermittent operation of the hard disk. While the invention has been described with reference to details of the illustrated embodiments, such details are not intended to limit the invention as defined in the appended claims.

I claim:

1. An arrangement for mounting and dismounting a removable hard disk drive casing having a handle connected to the casing by a shaft, comprising:

a rack arranged to receive said removable hard disk drive casing, an opening end of said rack including a bent portion, said bent portion having fastened thereto a T-shaped block, the cross-bar portion of the T-shaped block forming an inverted L-shape when viewed in the direction of mounting the hard disk drive casing, and the horizontal portion of the L-shape and the bent portion of the rack defining therebetween a retaining opening, wherein said handle is arranged to pivot between horizontal and vertical and includes an arc-shaped end, an arc-shaped notch on one side of said arc-shaped end, and a linear notch extending linearly on a second side of said arc-shaped end, said arc-shaped notch and said linear notch defining a retaining portion therebetween, and wherein said bent portion, said T-shaped block, and said handle are arranged such that when said handle is horizontal and said casing is pushed into said rack, said retaining portion passes said horizontal portion and said arc-shaped end engages the bent portion, thereby preventing the casing from being pushed fully into the rack, and when said handle is turned to vertical, said retaining portion enters the retaining opening to permit the casing to complete entry into and be retained in the rack.

2. An arrangement as claimed in claim 1, wherein a length of said bent portion of said rack is less than a longitudinal length of said linear notch, whereby when said handle is in a vertical position before mounting of said hard disk drive casing in said rack, said linear notch engages said horizontal portion of the L-shape, preventing further insertion of the casing into the rack until the handle is turned to a horizontal position.

* * * * *